United States Patent [19]

Nagano

[11] Patent Number: 5,003,841
[45] Date of Patent: Apr. 2, 1991

[54] BICYCLE PEDAL
[75] Inventor: Masashi Nagano, Osaka, Japan
[73] Assignee: Shimano Industrial Co., Ltd., Osaka, Japan
[21] Appl. No.: 392,338
[22] Filed: Aug. 11, 1989
[30] Foreign Application Priority Data
  Aug. 12, 1988 [JP] Japan ................ 63-202574
[51] Int. Cl.⁵ .................................... G05G 1/14
[52] U.S. Cl. ...................................... 74/594.4
[58] Field of Search ............ 74/594.1–594.6; 36/131, 132

[56] References Cited
U.S. PATENT DOCUMENTS

| 576,548 | 2/1897 | Cassidy | 74/594.6 |
| 4,089,236 | 5/1978 | Genzling | 74/594.6 X |
| 4,803,894 | 2/1989 | Howell | 36/131 X |
| 4,819,504 | 4/1989 | Sampson | 74/594.4 |
| 4,827,633 | 5/1989 | Feldstein | 74/594.6 X |

FOREIGN PATENT DOCUMENTS 3426103  1/1986  Fed. Rep. of Germany ..... 74/594.6

Primary Examiner—Vinh T. Luong
Attorney, Agent, or Firm—Edwin E. Greigg

[57] ABSTRACT

A bicycle pedal comprises a pedal body supported by a pedal shaft to be rotatable about an axis of the pedal shaft, and at least one clamp member attached to the pedal body for clamping a cleat fixed to a cyclist's shoe. The clamp member is displaced in a fore and aft direction from the pedal shaft to be movable between a cleat clamping position and a release position. The pedal body defines at least one guide surface located adjacent the axis of the pedal shaft with respect to the clamp member for guiding the cleat toward the clamp member.

10 Claims, 6 Drawing Sheets

BICYCLE PEDAL

BACKGROUND OF THE INVENTION

The present invention relates to a bicycle pedal, and more particularly to an improvement in a bicycle pedal comprising a pedal body supported by a pedal shaft to be rotatable about an axis of the pedal shaft, the pedal body including at least one clamp member for attaching a cleat fixed to a shoe.

DESCRIPTION OF THE PRIOR ART

Various types of pedals are known, which are constructed for attaching shoes having cleats, and one example of such pedals is disclosed in European Pat. No. 0 146 454. However, most of the known pedals are intended for racing bicycles, with an emphasis placed on how to attach the cleat to the pedal body rigidly. Little attention has been paid to the facility in attaching the cleat to the pedal body.

That is, in the prior art, the cleat will not readily become disengaged from the pedal body once the cleat is attached thereto. However, it is not only time-consuming but great care must be taken in attaching the cleat. In certain cases, the cleat is attached without regard to safety.

SUMMARY OF THE INVENTION

A primary object of the present invention is to provide a bicycle pedal which allows the cleat to be attached to the pedal body reliably and quickly and with little attention paid thereto.

Another object of the invention is to provide a bicycle pedal which achieves the above primary object with a relatively simple construction.

A further object of the invention is to provide a bicycle pedal from which the cleat, once attached, does not become disengaged easily.

In order to achieve the primary object noted above, a bicycle pedal according to the present invention, comprises a pedal body supported by a pedal shaft to be rotatable about an axis of the pedal shaft, and at least one clamp member attached to the pedal body for clamping a cleat, the clamp member being displaced in a fore and aft direction from the axis of the pedal axis to be movable between a cleat clamping position and a release position, characterized in that the pedal body defines at least one guide surface located adjacent the axis of the pedal shaft with respect to the clamp member for guiding the cleat toward the clamp member.

With the above construction, even when the cleat to be attached is displaced to some extent from a proper position relative to the pedal body, the guide surface serves to guide the cleat toward the clamp member. The cleat attaching operation is thus carried out reliably and quickly with little attention paid thereto. This feature is particularly advantageous where the invention is applied to a mountain type bicycle with which the cyclist frequently places his or her foot on the pedal and removes it therefrom.

Other objects, functions and advantages of the present invention will be apparent from the following description.

BRIEF DESCRIPTION OF THE DRAWINGS

FIGS. 11 and 12 are explanatory views of different cleats.

DESCRIPTION OF THE PREFERRED EMBODIMENTS

In the drawings, number 1 indicates a pedal shaft which may be attached to the free end of a crank arm of a bicycle, and number 2 indicates a pedal body supported by the pedal shaft 1 to be rotatable about its axis L. The pedal body 2 comprises a hollow support 21 supported by the pedal shaft 1 through bearings not shown, a pair of front arms 22 extending forwardly from longitudinally opposite ends of the support 21, a pair of rear arms 23 extending rearwardly therefrom, a front tread 24 extending between the front arms 22, and a rear tread 25 extending between the rear arms 23.

Number 3 indicates a cleat attached to the bottom of a shoe not shown. As shown in detail in FIG. 6, the cleat 3 comprises a disk-like attachment portion 31 for attachment to the shoe, a front leg 32 extending downwardly from a front end of the attachment portion 31, and a rear leg 33 extending downwardly from a rear end thereof. Each of the legs 32 and 33 defines, at and adjacent a free end thereof, an engaging surface 32a or 33a extending perpendicular to the longitudinal direction of the leg, and a guide surface 32b or 33b inclined in a tapered way from a projecting end of the engaging surface 32a or 33a toward the free end of the leg. Each engaging surface 32a or 33a has an arcuate peripheral edge, and each leg 32 or 33 also has an arcuate outer peripheral wall. Further, each engaging surface 32a or 33a defines an inclined surface 32c or 33c at one lateral side thereof, which is inclined toward the center of the engaging surface.

In the embodiment shown in FIGS. 1 through 6, the pedal body 2 further comprises a front clamp member 4 disposed forwardly of and extending parallel to the rotational axis L of the pedal body 2. The front clamp member 4 has a greater length than the engaging surface 32a of the cleat 3. This front clamp member 4 has an elongate shape extending axially of the pedal shaft 1. The clamp member 4 defines a guide portion 43 extending over the entire length thereof and inclined downwardly from a forward end to a rear end thereof. Further, the clamp member 4 defines a cleat engaging portion 42 disposed on the reverse side of the guide portion 43, which extends from the rear end of the clamp member 4 and over the entire length thereof. The cleat engaging portion 42 is engageable with the engaging surface 32a of the cleat 3 for holding the front leg 32 of the cleat 3 in position. A restricting portion 5, which will be described later, is defined on a rear end surface between the cleat engaging portion 42 and guide portion 43. A further guide portion 41 is defined between the restricting portion 5 and guide portion 43 for contacting the guide surface 32b of the cleat 3 to guide the latter.

The front clamp member 4 includes a pair of mounting elements 44 disposed at longitudinally opposite ends thereof, respectively, and bent 90 degrees to be opposed to each other. These mounting elements 44 are pivotally connected to the front arms 22 through pivot shafts 7, respectively. More particularly, each pivot shaft 7 extending parallel to the axis L of the pedal body 2 is screwed into each front arm 22, while each mounting element 44 defines an engaging bore for receiving an extreme end of the pivot shaft 7. Thus, the extreme ends of the opposite pivot shafts 7 are inserted into the engaging bores, respectively, whereby the front clamp member 4 is pivotable on the pivot shafts 7 between a clamp position for fastening the cleat 3 to the pedal body 2 and a release position for disengaging the cleat 3 from the pedal body 2.

Figure 5:
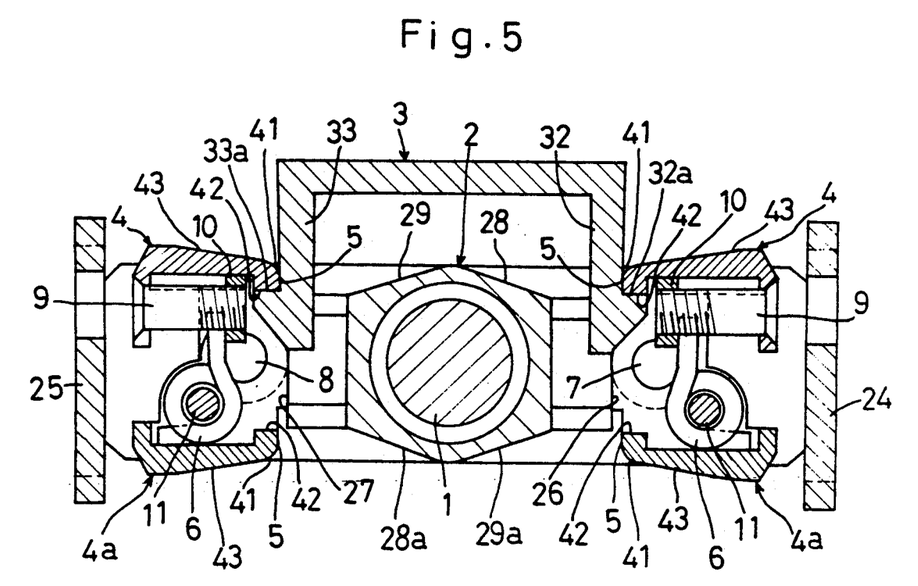

The pedal body 2 further comprises a rear clamp member 4 disposed rearwardly of its rotational axis L and opposed to the front clamp member 4 across the axis L. The rear clamp member 4 has the same construction as the front clamp member 4, and will not be described in detail, with like reference numbers affixed to like components. As is the front clamp member 4, the rear clamp member 4 is pivotable on pivot shafts 8 extending parallel to the axis L to switch between the clamp position and release position. The two clamp members 4 are urged to the clamp position through springs 6. In the clamp position as shown in FIG. 5, the restricting portion 5 on the rear end of the front clamp member 4 and restricting portion 5 on the front end of the rear clamp member 4 limit fore and aft movement of the cleat 3 contacting the cleat engaging portions 42.

Each spring 6 comprises a torsion spring having a coiled intermediate portion with opposite end legs extending tangentially. One of the end legs is in movable contact with the clamp member 4, and its resilient force is adjustable by turning an adjusting screw 9 attached to the clamp member 4. More particularly, through bores are defined in the front end of the front clamp member 4 and in the rear end of the rear clamp member 4 for supporting the adjusting screws 9. Each adjusting screw 9 carries a spring bearing 10 screwed thereto which engages one end of each spring 6 and which is movable relative to the clamp member 4. Thus, the adjusting screw 9 is turned to move the spring bearing 10 for adjusting the force of the spring 6.

The support 21 of the pedal body 2 includes contact portions 26 and 27 projecting forwardly and rearwardly for contacting the mounting elements 44 of the respective clamp members 4 to stop the clamp members 4 at the clamp positions.

The support 21 defines guide surfaces 28 and 29 extending over the entire length thereof on opposite, forward and rearward sides of the axis L of the pedal body 2. The guide surface 28 is inclined forwardly downwardly toward the front clamp member 4, and the guide surface 29 is inclined rearwardly downwardly toward the rear clamp member 4. These guide surfaces 28 and 29 serve to guide the legs 32 and 33 of the cleat 3 toward the two clamp members 4, respectively.

The treads 24 and 25 define a plurality of non-slip recesses 24a and 25a on their surfaces, respectively. The front arms 22 and rear arms 23, on the other hand, define a plurality of non-slip projections 22a and 23a on their surfaces, respectively.

In the embodiment shown in FIGS. 1 through 6, the pedal body 2 comprises not only the clamp members 4 on one face thereof, but a front clamp member 4a and a rear clamp member 4a on the other face, i.e. the reverse side, thereof also. The clamp members 4a on the other face have substantially the same construction as the clamp members 4 already described, and are pivotable relative to the pedal body 2 between clamp and release positions. Thus, either the front face or reverse face of the pedal body 2 may be selected for securing the shoe. The pedal body 2 includes, also on the reverse face thereof, guide surfaces 28a and 29a similar to those provided on the front face.

Figure 1:
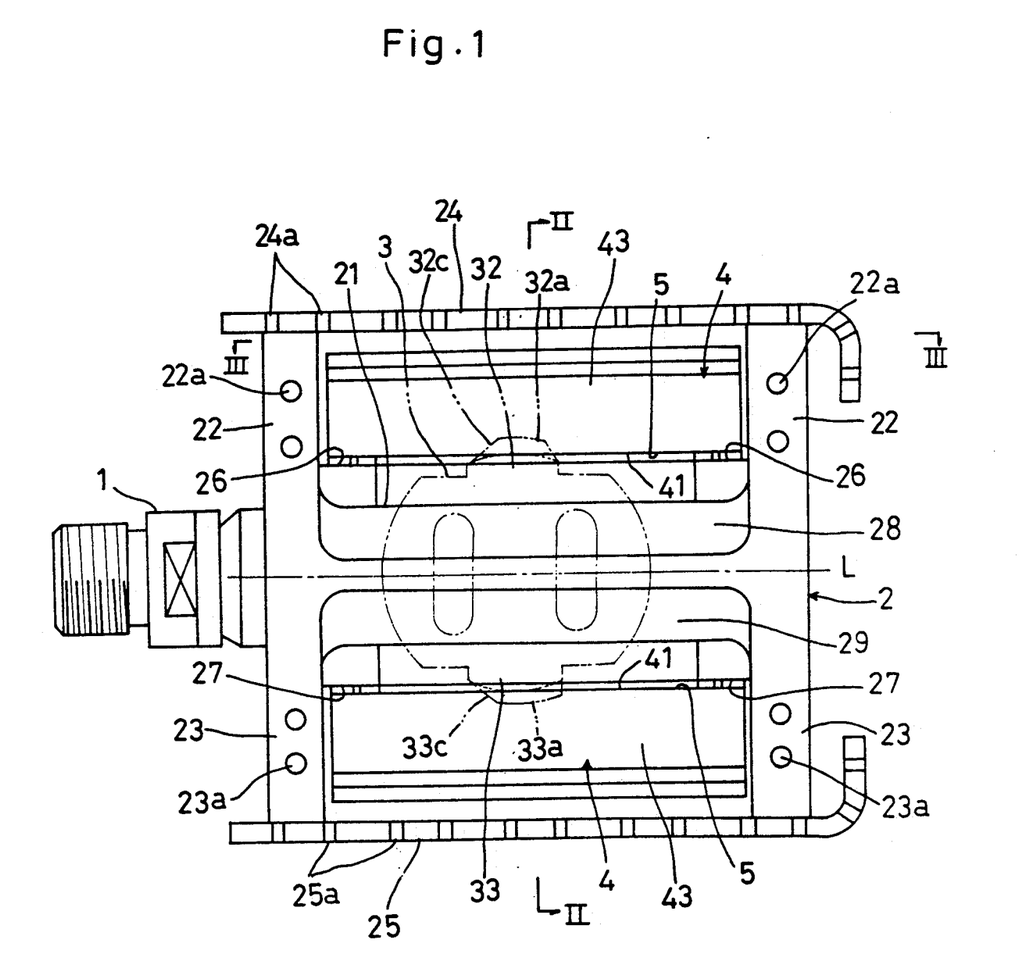
FIG. 1 is a plan view of a pedal according to the present invention.
Figure 2:
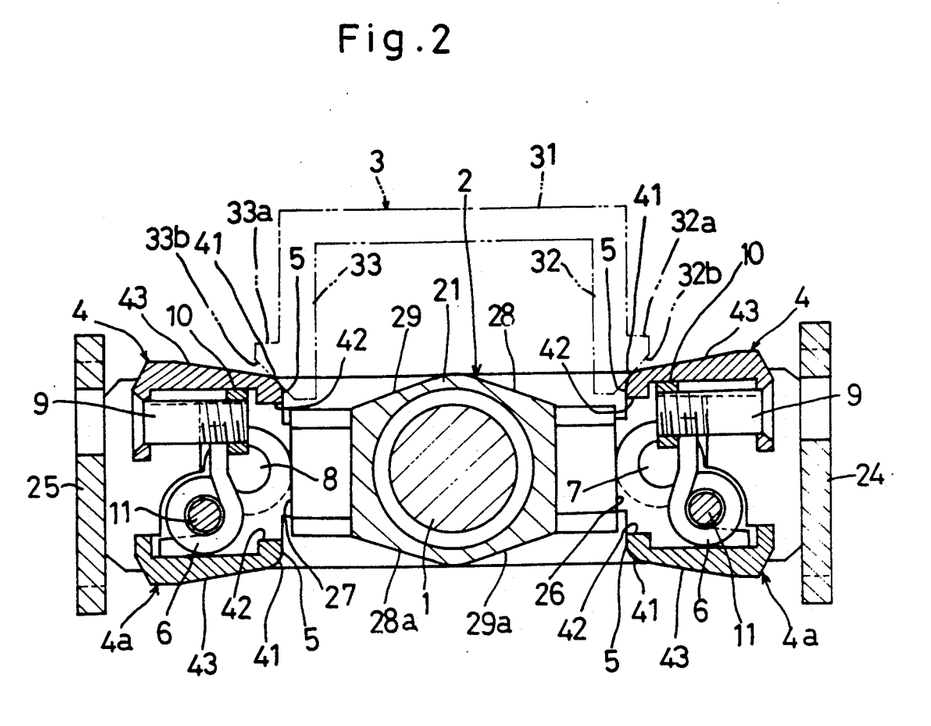
FIG. 2 is an enlarged sectional view taken on line II—II of FIG. 1.
Figure 3:
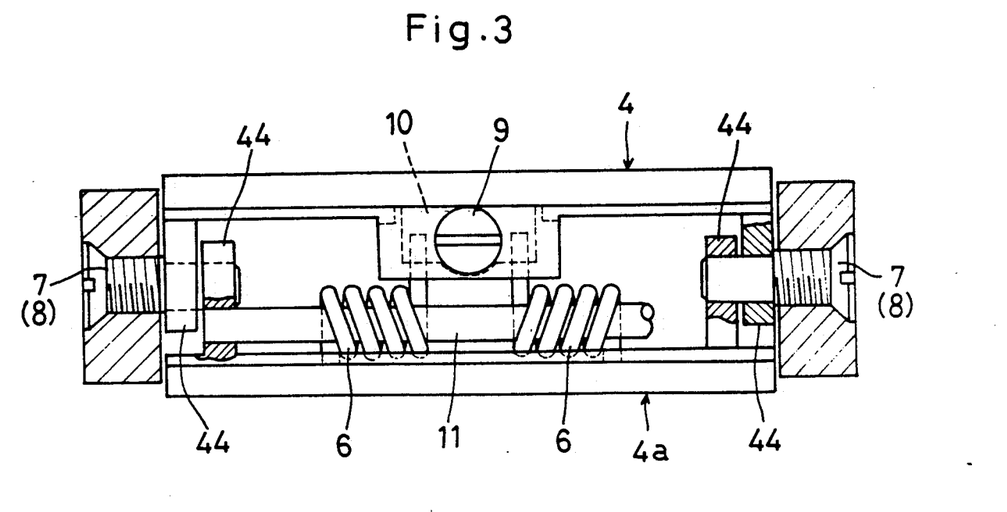
FIG. 3 is an enlarged sectional view taken on line III—III of FIG. 1.

As shown in FIG. 3, mounting elements 44 of the clamp members 4a on the reverse face are spaced from each other by a slightly less distance than those of the clamp members 4 on the front face, and are pivotally supported on the extreme ends of the pivot shafts 7 and 8, respectively. The mounting elements 44 of the clamp members 4a are movable into contact with the contact portions 26 and 27 of the pedal body 2 to stop the clamp members 4 at the clamp positions.

A spring bearing shaft 11 extends between two mounting elements 44 of each clamp member 4 for supporting coiled portions of springs 6. One end of each spring 6 is connected to a back surface of the clamp member 4a, whereby the resilient force of spring 6 is adjustable by turning the adjusting screw 9.

Figure 4:
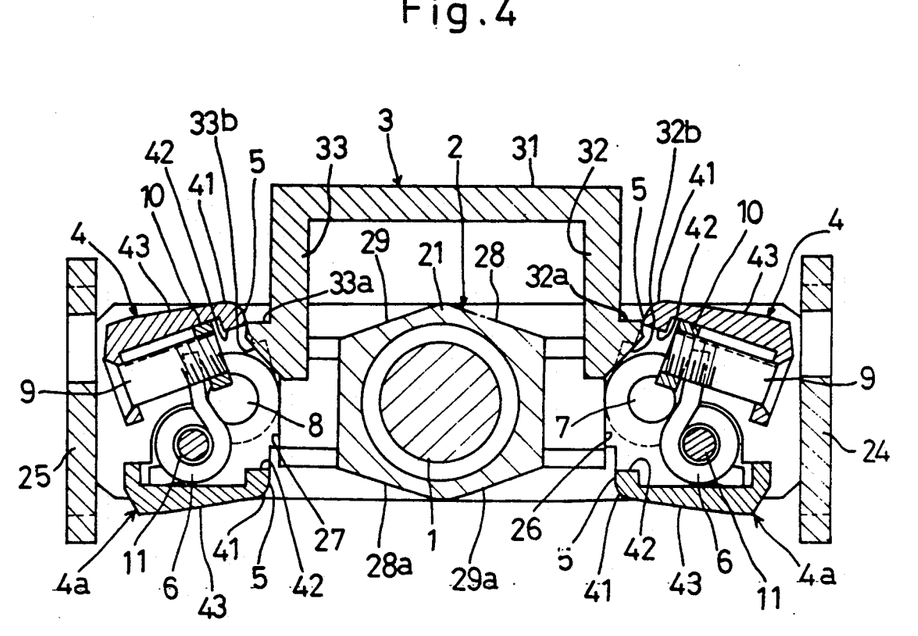
FIGS. 4 through 6 are explanatory views showing operating states of the pedal.

When attaching the cleat 3 of a shoe to the pedal having the construction as described above, the user forces his foot down with the guide surface 32b on the front leg 32 of the cleat 3 contacting the cleat guide portion 41 of the front clamp member 4, and the guide surface 33b on the rear leg 33 contacting the cleat guide portion 41 of the rear clamp member 4. This downward depression applies a forward component of force to the cleat guide portion 41 on the front clamp member 4, and a rearward component of force to the cleat guide portion 41 on the rear clamp member 4. As a result, the front and rear clamp members 4 move to the respective release positions against the forces of springs 6 as shown in FIG. 4. With the movement of the clamp members 4 to the release positions, the extreme ends of the front and rear legs 32 and 33 advance to the reverse sides of the clamp members 4 and become disengaged from the cleat guide portions 41. Then the clamp members 4 move to the clamp positions under restoring forces of the springs 6, with the cleat engaging portions 42 engaging the engaging surfaces 32a and 33a of the cleat 3, thereby holding the cleat 3 in position.

Thus, according to the present invention, the cleat 3 may be attached with a single action consisting only of the downward depression of the shoe. The shoe may be fixed to the pedal easily and quickly without paying much attention, thereby promoting safety of cycling. This is particularly advantageous when the pedal is applied to a mountain type bicycle, with which the cyclist frequently moves his or her foot from the pedal to the ground and places it back on the pedal.

The cleat 3 as fixed to the pedal is reliably maintained in position since fore and aft movement of the cleat 3 is limited by the restricting portions 5 of the clamp members 4. The restricting portions 5 may allow slight fore and aft movement of the cleat 3 as long as the cleat 3 is maintained in the clamped state.

The cleat guide portion 41 and cleat engaging portion 42 of each clamp member 4 extend parallel to the axis L of the pedal body 2 over a length exceeding the width of the engaging surface 32a or 33a of the cleat 3. Therefore, even when the cleat 3 being attached is somewhat displaced rightward or leftward from the center of the pedal body 2, the cleat guide portions 41 will reliably guide the cleat 3 for enabling the cyclist to connect the cleat 3 to the pedal promptly. Once placed in position, the cleat 3 may be moved right and left along the engaging portions 42 to an optimal position relative to the pedal body 2. The cleat 3 may be moved to an optimal position with ease since, as described hereinbefore, each of the legs 32 and 33 defines the arcuate outer periphery which allows the shoe to be moved right and left along the engaging portions 42 while turning the shoe right and left.

Further, each clamp member 4 defines the guide portion 43 on its surface for guiding the leg 32 or 33 of the cleat 3 toward the guide portion 41. This construction is capable of smoothly guiding the leg 32 or 33 to the cleat guide portion 41, to facilitate attachment of the cleat 3, even when the legs 32 and 33 of the cleat 3 being attached are slightly displaced in the fore and aft direction relative to the clamp members 4, and either the front leg 32 or rear leg 33 contact the surface of one clamp member 4. In addition, since each guide portion 43 is elongated axially of the pedal shaft 1, the leg 32 or 33 may be smoothly guided toward the cleat guiding portion 41 even when the leg 32 or 33 is slightly displaced to the right or left from the center of the clamp member 4. This feature further facilitates attachment of the cleat 3.

Moreover, the support 21 of the pedal body 2 defines the guide surfaces 28 and 29 for guiding the legs 32 and 33 of the cleat 3 towards the clamp members 4. This construction is capable of reliably guiding the leg 32 or 33 to the cleat guide portion 41, to facilitate attachment of the cleat 3, even when the legs 32 and 33 of the cleat 3 being attached are slightly displaced in the fore and aft direction relative to the clamp members 4, and either the front leg 32 or rear leg 33 contact the surface of the support 21. As are the cleat guide portions 41, these guide surfaces 28 and 29 are formed long axially of the pedal shaft 1. Therefore, the leg 32 or 33 may be smoothly guided toward the cleat guiding portion 41 even when the leg 32 or 33 is slightly displaced to the right or left from the center of the clamp member 4.

In the described embodiment, the pedal body 2 comprises the front clamp member 4 and rear clamp member 4 not only on one face thereof but on the other face also. Thus, one of the tread faces of the pedal body 2 may be selected, to which the cleat 3 is attached in one action as described above. This pedal is, therefore, very convenient when applied to a mountain type bicycle.

As described hereinbefore, the treads 24 and 25 of the pedal body 2 define non-slip recesses 24a and 25a on the surfaces thereof, while the front arms 22 and rear arms 23 define non-slip projections 22a and 23a. This construction allows the cleat 3 held by the clamp members 4 to be reliably maintained in position relative to the pedal body 2, and prevents clattering of the cleat 3 as well.

The legs 32 of the cleat 3 define the arcuate peripheral walls as described hereinbefore. Consequently, the cleat 3 may be attached to the pedal reliably even when the shoe is depressed with the cleat 3 slightly inclined right or left relative to a fore and aft centerline of the pedal body 2.

When detaching the cleat 3 from the pedal, the cyclist has only to turn his or her foot outwardly on the pedal and lift the inward side of the shoe (opposed to the crank arm) by using the outward side as a pivoting point. This causes the clamp members 4 to move to the release positions against the forces of springs 6.

The inclined surface 32c or 33c defined on each engaging surface 32a or 33a of the cleat 3 greatly facilitates detachment of the cleat 3. The forces of springs 6 are adjusted to allow the clamp members 4 to be moved with ease by the lifting force applied by the cyclist.

Figure 6:
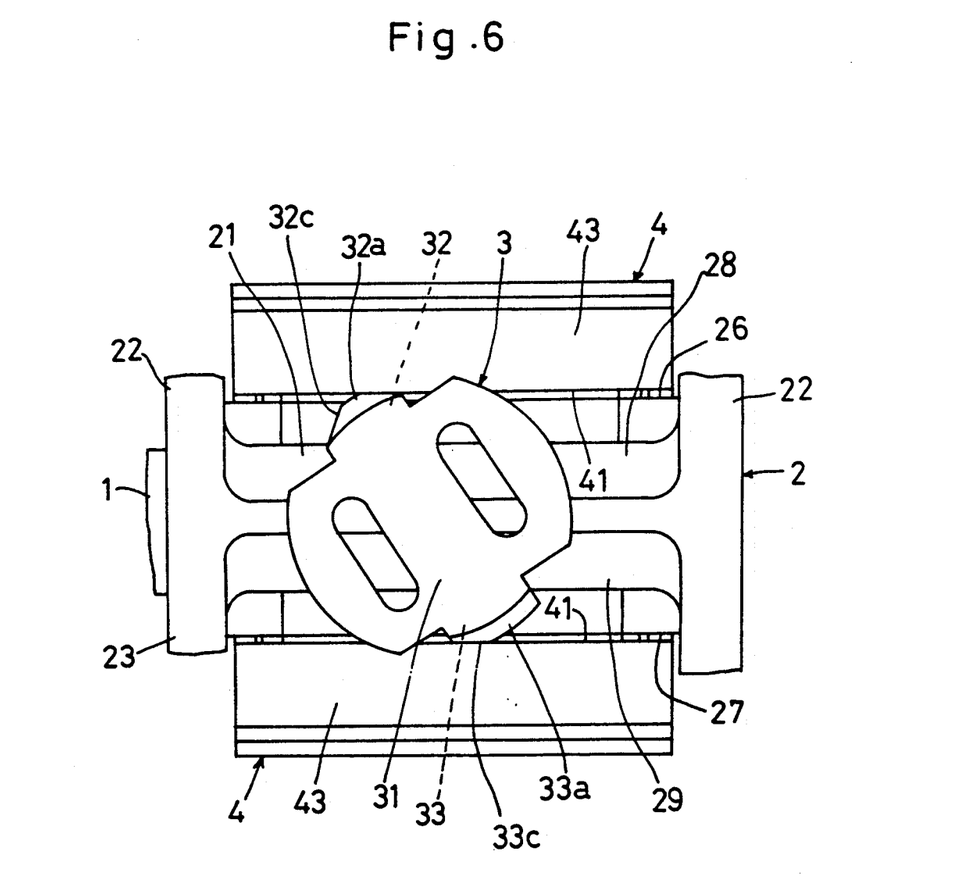

The cleat 3 is detachable by lifting the shoe after turning it to an appropriate degree on the tread face of the pedal body 2 as shown in FIG. 6. When the shoe is turned as above, the engaging surface 32a of the front leg 32 becomes disengaged from the cleat engaging portion 42 or the engaging surface 33a of the rear leg 33 becomes disengaged from the cleat engaging portion 42. Alternatively, the cleat 3 may be detached simply by lifting the shoe without turning it, to move the clamp members 4 to the release positions against the forces of springs 6.

Both the front clamp member 4 and rear clamp member 4 are pivotable in the described embodiment. Alternatively, one of the clamp members 4 may be immovable, with only the other allowed to pivot. In this case, the pivoting amount of the pivotable clamp member 4 is twice the pivoting amount of each clamp member 4 where both are pivotable, and the immovable clamp member 4 may be formed integrally with the pedal body 2.

Further, the two clamp members 4 may be provided on only one face of the pedal body 2. In this case, one leg of each spring 6 is connected to one clamp member 6, with the other leg connected to the pedal body 2.

Figure 7:
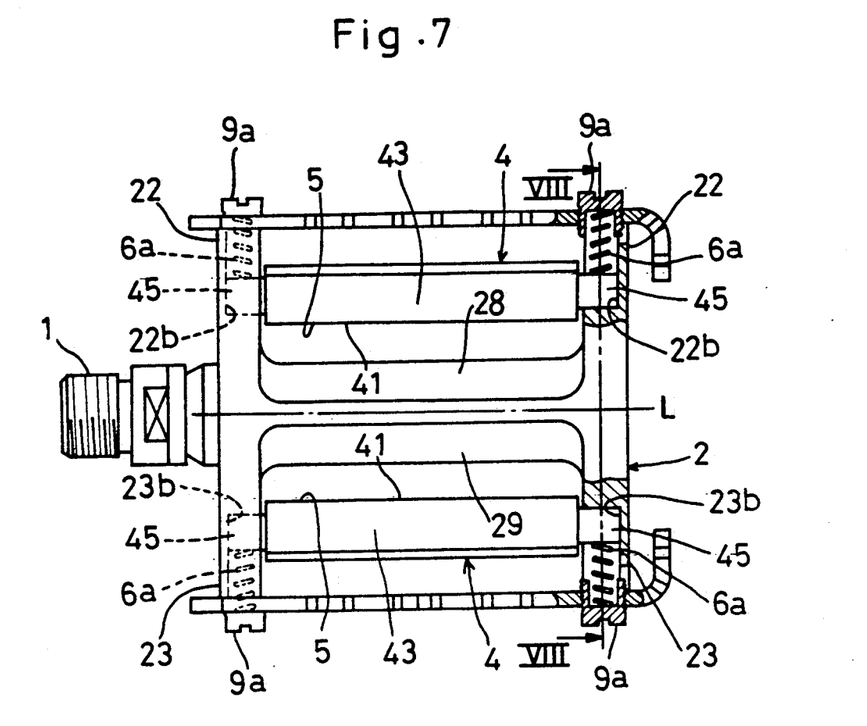
FIG. 7 is a plan view, partly broken away, of another embodiment of the invention.
Figure 8:
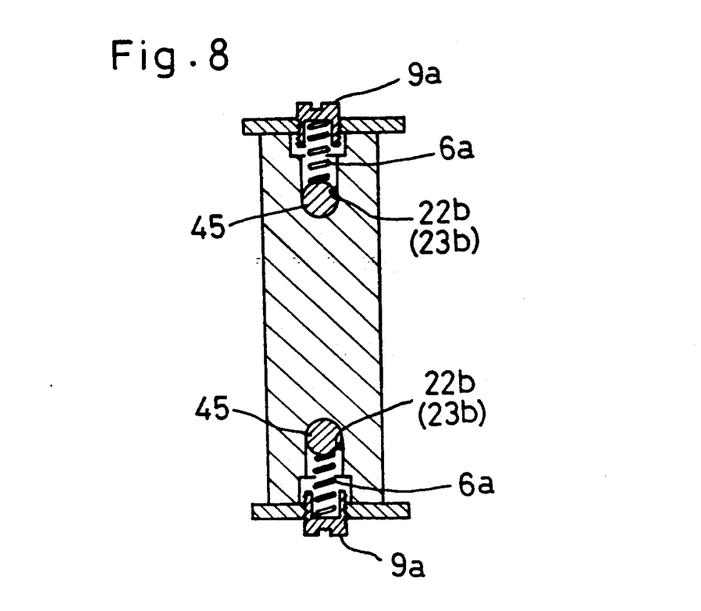
FIG. 8 is a side view in vertical section taken along line VIII—VIII of the pedal shown in FIG. 7, FIGS. 9 and 10 are partial plan views of further embodiments of the invention, respectively.

Instead of being pivotable about the pivot shafts 7 and 8, the clamp members 4 may be movable in the fore and aft direction, without pivoting, as shown in FIGS. 7 and 8. In this construction, each clamp member 4 includes engaging projections 45 at opposite ends thereof, and the front arms 22 and rear arms 23 define guide recesses 22b and 23b for guiding the engaging projections 45. A spring 6a is mounted between each engaging projection 45 and the tread 24 or 25 of the pedal body 2. It is desirable for each tread 24 or 25 to include adjusting screws 9a for adjusting the force of springs 6a.

In the foregoing embodiments, the clamp members 4 are provided forwardly and rearwardly in a symmetric, arrangement about the axis L of the pedal body 2. Instead, only one clamp member 4 may be provided forwardly or rearwardly as shown in FIGS. 9 and 10.

Figures 9, 11:
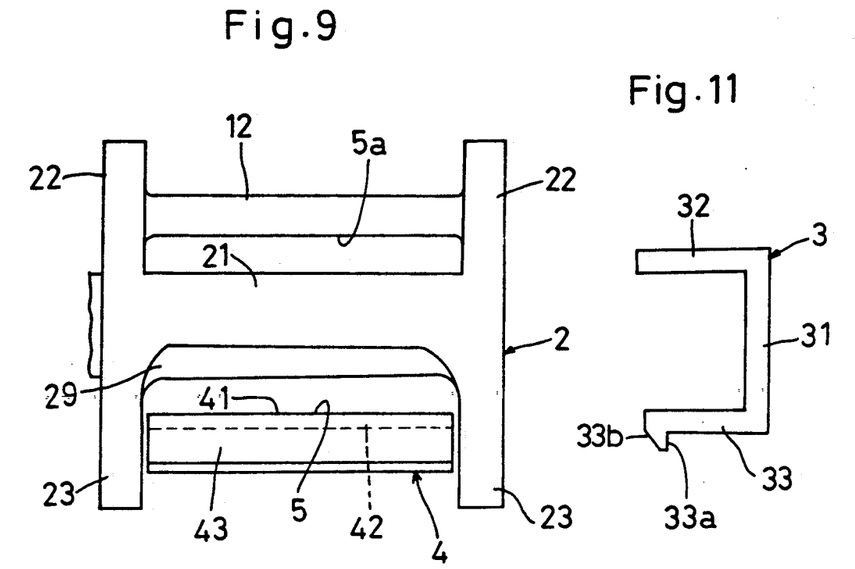

In the construction shown in FIG. 9, the single clamp member 4 is mounted between rear arms 23 of the pedal body 2 to be movable between a clamp position and a release position, while a restricting member 12 is mounted between front arms 22 of the pedal body 2. The restricting member 12 defines a restricting portion 5a on a rear face thereof opposed to the support 21. The cleat 3 in this case comprises a front leg 32 defining a mounting portion 31, an engaging surface 33a and a guide surface 33b on rear leg 33 as shown in FIG. 11, and the front leg 32 is shown without the engaging surface 32a and guide surface 32b. The single clamp member 4 clamps the cleat 3, with the restricting portion 5a cooperating with the clamp member 4 to prevent fore and aft movement of the cleat 3.

Figures 10, 12:
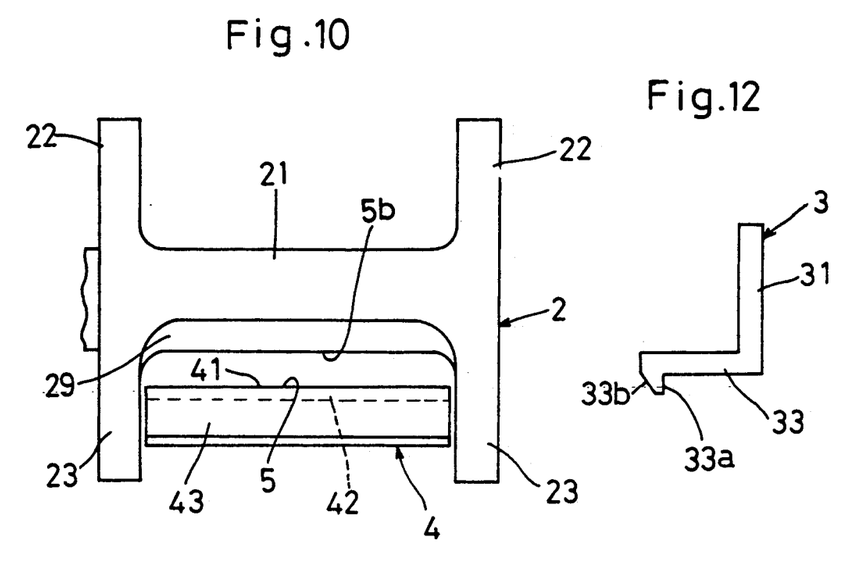

In the construction shown in FIG. 10, the single clamp member 4 is mounted between rear arms 23 of the pedal body 2 to be movable between a clamp position and a release position, while the support 21 has a rear face opposed to the clamp member 4 and acting as a restricting portion 5b. As shown in FIG. 12, the cleat 3 in this case comprises a mounting portion 31 a rear leg 33 defining an engaging surface 33a and a guide surface 33b. The single clamp member 4 clamps the cleat 3, with the restricting portion 5b cooperating with the clamp member 4 to prevent the fore and aft movement of the cleat 3.

I claim:

1. A bicycle pedal comprising:
    a pedal body supported by a pedal shaft for rotation about an elongated axis (L) of the pedal shaft,
    at least one clamp member (4) attached to the pedal body for clamping a cleat (3), the clamp member being displaced in a fore and aft direction from the axis of the pedal shaft to be movable between a cleat clamping position and a cleat release position, said at least one clamp member (4) is pivotable about a pivot shaft (7, 8) disposed substantially parallel to said axis (L) of the pedal shaft between said cleat clamping position and said cleat release position, and said at least one clamp member defines a guide surface (43) adjacent the axis of said pedal shaft for guiding said cleat (3) from said at least one clamp member (4) toward said axis (L) of the pedal shaft for securing said cleat to said at least one clamp member.

2. A pedal as claimed in claim 1, wherein said clamp member (4) is urged toward said cleat clamping position by urging means (6).

3. A pedal as claim in claim 2, wherein said clamp member (4) includes a cleat engaging portion (42), and a cleat guide portion (41) extending along and opposed to the axis (L) of said pedal shaft, said guide surface (43) defining an inclined surface for guiding said cleat (3) to said cleat guide portion (41).

4. A pedal as claimed in claim 9, wherein a pair of clamp members and a pair of guide surfaces are provided forwardly and rearwardly of the axis of said pedal shaft, respectively.

5. A bicycle pedal comprising:
    a pedal body supported by a pedal shaft for rotation about an elongated axis (L) of the pedal shaft, and
    a clamp mechanism mounted on an upper face and a lower face of said pedal body, said clamp mechanism including a pair of clamp members (4,4) each mounted in a position displaced from the axis (L) of the pedal shaft in a fore and aft direction of the pedal, said clamp members are pivotable about a pivot shaft (7, 8) disposed substantially parallel to said axis (L) of the pedal shaft between a cleat clamping position and a cleat release position, said pair of clamp members being urged toward the cleat clamping position by urging means at all times and being opposed to each other so as to clamp a cleat (3) on said clamp mechanism in an intermediate portion between said pair of clamp members.

6. A pedal as claimed in claim 5, wherein said urging means comprises a pair of springs (6), each retained on a spring bearing shaft (11) extending along and parallel to said axis (L) of the pedal shaft, and engaged with each of said clamp members (4).

7. A pedal as claimed in claim 6, in which each of said springs (6) includes an adjusting mechanism (9) for adjusting an urging force against each of said clamp members (4).

8. A pedal as claimed in claim 5, wherein said clamp mechanism allows pivotal movement of the pair of clamp members (4) by depressing front and rear legs of said cleat (3) between said pair of clamp members (4) to define openings therebetween for receiving said front and rear legs of said cleat (3), which allows said cleat (3) to be clamped in the pedal by engagement between engaging surfaces (32a, 33a) defined on said front and rear legs of said cleat (3) and cleat engaging portions (42, 42) defined on said clamp members (4).

9. A pedal as claimed in claim 5, wherein said clamp mechanism allows said cleat (3) to be engaged and substantially aligned with said pedal in a fore and aft direction of the pedal to pivot relative to the pedal thereby reducing contacting areas between engaging surfaces (32a, 33a) defined on said cleat (3) and cleat engaging portions (42) defined in said clamp members (4) so as to complete a releasing and pull-up operation of said cleat (3) by a slight pivotal movement of said pair of clamp members (4).

10. A pedal as claimed in claim 5, wherein said clamp mechanism includes a pair of clamp members (4) mounted on an upper face and a lower face of the pedal body, respectively.

* * * * *

REEXAMINATION CERTIFICATE (2620th)
United States Patent [19]
Nagano

[11] B1 5,003,841

[45] Certificate Issued Jul. 11, 1995

[54] BICYCLE PEDAL

[75] Inventor: Masashi Nagano, Osaka, Japan

[73] Assignee: Shimano Industrial Co., Ltd., Osaka, Japan

Reexamination Request:
No. 90/003,318, Jan. 27, 1994

Reexamination Certificate for:
Patent No.: 5,003,841
Issued: Apr. 2, 1991
Appl. No.: 392,338
Filed: Aug. 11, 1989

[30] Foreign Application Priority Data

Aug. 12, 1988 [JP] Japan .............. 63-202574

[51] Int. Cl.⁶ .............................................. G05G 1/14
[52] U.S. Cl. .................................. 74/594.4; 74/594.6
[58] Field of Search ....................... 74/594.1–594.6; 36/131, 132

[56] References Cited

U.S. PATENT DOCUMENTS

| | | | |
|---|---|---|---|
| 4,686,867 | 8/1987 | Bernard et al. | 74/594.6 |
| 4,762,019 | 8/1988 | Beyl | 74/594.6 |
| 4,893,420 | 1/1990 | Bezin et al. | 36/131 |

FOREIGN PATENT DOCUMENTS

| | | | |
|---|---|---|---|
| 146454 | 6/1985 | European Pat. Off. | 74/594.6 |
| 2612869 | 9/1988 | France | 74/594.6 |
| 2623464 | 5/1989 | France | 74/594.6 |

*Primary Examiner*—Vinh I. Luong

[57] ABSTRACT

A bicycle pedal comprises a pedal body supported by a pedal shaft to be rotatable about an axis of the pedal shaft, and at least one clamp member attached to the pedal body for clamping a cleat fixed to a cyclist's shoe. The clamp member is displaced in a fore and aft direction from the pedal shaft to be movable between a cleat clamping position and a release position. The pedal body defines at least one guide surface located adjacent the axis of the pedal shaft with respect to the clamp member for guiding the cleat toward the clamp member.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5-10 is confirmed.

Claims 1-3 are cancelled.

Claim 4 is determined to be patentable as amended.

4. A pedal as claimed in claim [9] *3*, wherein a pair of clamp members and a pair of guide surfaces are provided forwardly and rearwardly of the axis of said pedal shaft, respectively.

* * * * *